Figure 1:
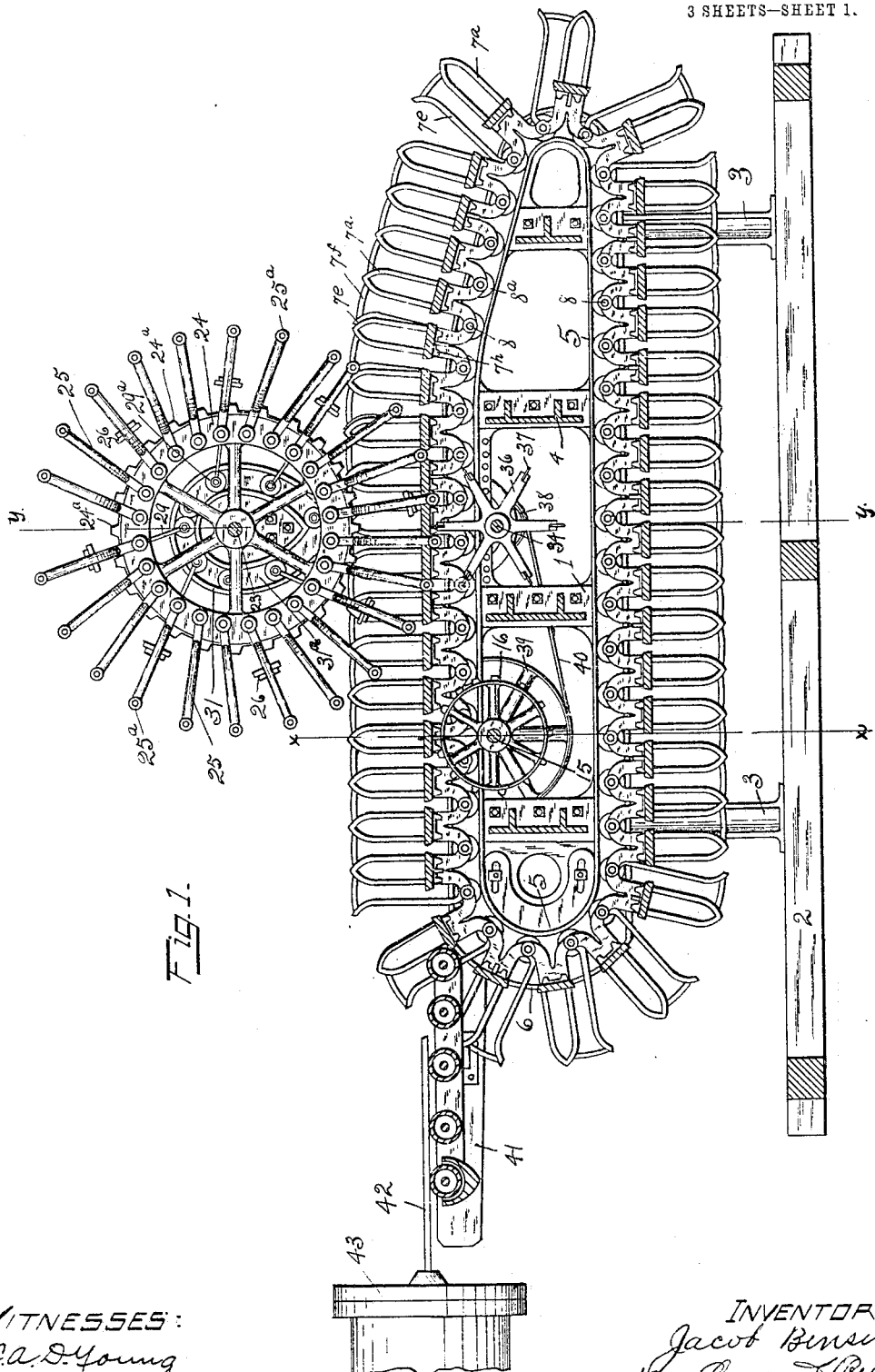

No. 801,639. PATENTED OCT. 10, 1905.
J. BENSING.
MACHINE FOR MAKING CLAY SHINGLES AND THE LIKE.
APPLICATION FILED MAR. 13, 1905.

3 SHEETS—SHEET 1.

WITNESSES:
C. A. D. Young
D. C. Walter

INVENTOR:
Jacob Bensing
By Owen & Owen
His attorneys.

No. 801,639. PATENTED OCT. 10, 1905.
J. BENSING.
MACHINE FOR MAKING CLAY SHINGLES AND THE LIKE.
APPLICATION FILED MAR. 13, 1905.
3 SHEETS—SHEET 2.
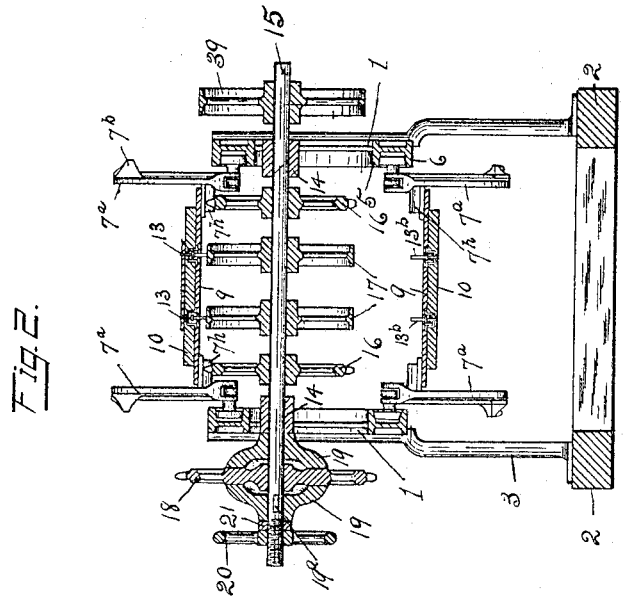
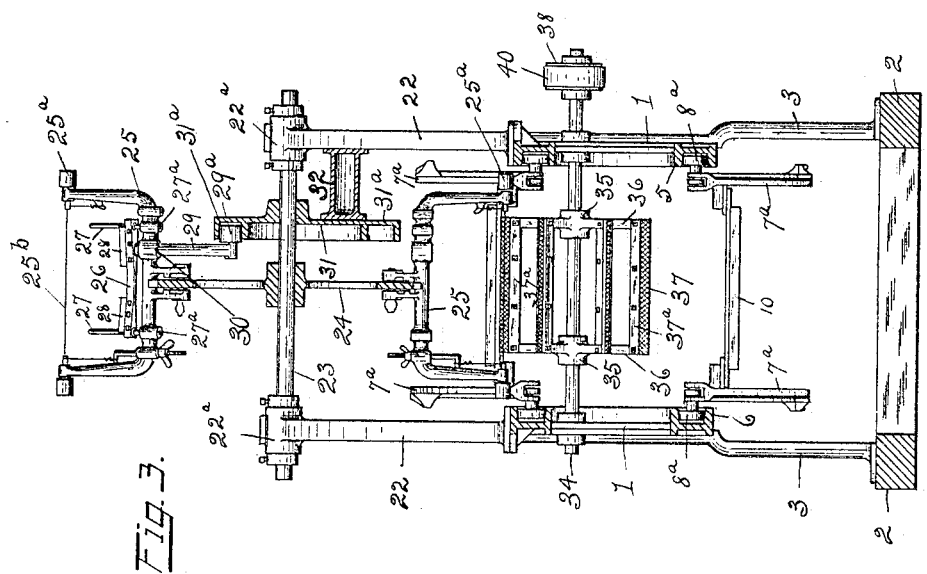
WITNESSES:
C. A. D. Young
D. C. Walter
INVENTOR:
Jacob Bensing
By Owen & Owen
His attorneys.

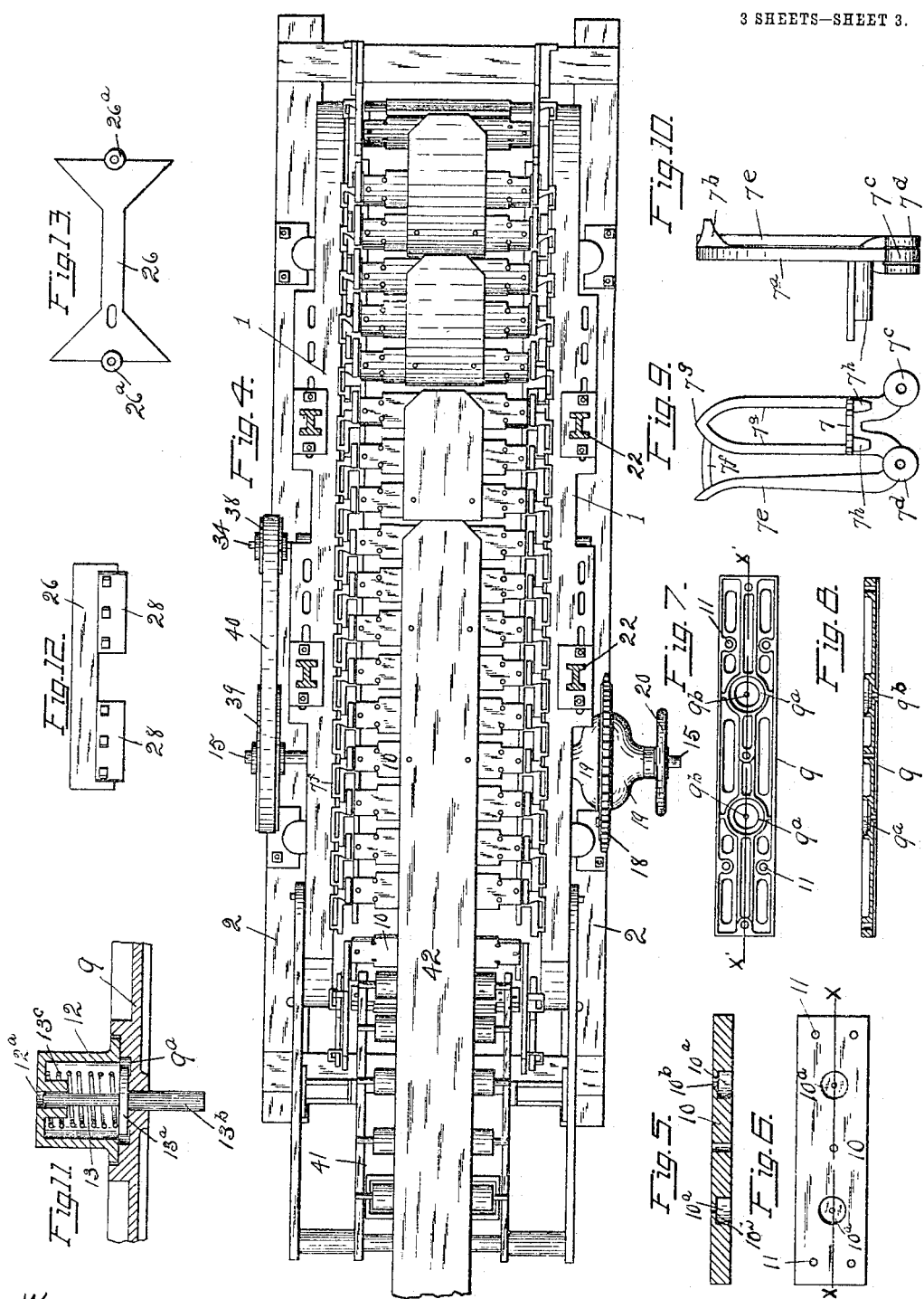

UNITED STATES PATENT OFFICE.

JACOB BENSING, OF MALINTA, OHIO.

MACHINE FOR MAKING CLAY SHINGLES AND THE LIKE.

No. 801,639.        Specification of Letters Patent.        Patented Oct. 10, 1905.

Application filed March 13, 1905. Serial No. 249,726.

*To all whom it may concern:*

Be it known that I, JACOB BENSING, a citizen of the United States, and a resident of Malinta, in the county of Henry and State of Ohio, have invented certain new and useful Improvements in Machines for Making Clay Shingles and the Like; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to the class of machines employed for automatically cutting one or more columns of clay or other plaster substance into sections of the desired length for the formation of tile, brick, or other plastic products as the column is continuously forced from the die of a mill and has especial reference to the manufacture of roofing-tile or so-called "clay shingles" and to certain improvements in the details of construction of the machines shown and described in United States Letters Patent Nos. 411,638, 524,302, 563,252, 621,315, and 718,077, granted to me, respectively, September 24, 1889, August 14, 1894, July 7, 1896, March 21, 1899, and January 13, 1903.

The primary object of my invention is the provision of simple and efficient means whereby the class of plastic products known as "clay shingles" or "roofing-tile" are caused to be automatically cut into predetermined lengths from a continuously-moving stream or column of clay as it issues from the die of a mill, perforated to form nail-receiving apertures therein and the edges or corners thereof trimmed to form a tile or shingle of the desired shape.

A further object of my invention is the provision of means, in combination with the revolving cutter-wires, whereby each wire is cleaned after a cutting operation, thus removing therefrom all adhering portions of the column which would otherwise accumulate thereon and insuring a more perfect and efficient working of the machine.

While the essential features of my invention are necessarily susceptible of modification, the preferred embodiment thereof is illustrated in the accompanying drawings, in which—

Figure 1 is a central vertical longitudinal section of a machine embodying my invention. Figs. 2 and 3 are cross-sections taken, respectively, on the dotted lines *x x* and *y y* in Fig. 1. Fig. 4 is a plan of the machine with the cutter mechanism removed. Figs. 5 and 6 are central longitudinal sectional and bottom plan views, respectively, of one of the top carrier-bars of the endless conveyer. Figs. 7 and 8 are top plan and longitudinal sectional views, respectively, of one of the bottom carrier-bars of the conveyer. Figs. 9 and 10 are different elevations of the conveyer-links. Fig. 11 is an enlarged detail of a portion of one of the bottom carrier-bars of the conveyer and associated perforating device, the same being shown in vertical section; and Figs. 12 and 13 are elevation and plan views, respectively, of the cutter-head of the trimmer.

Like numerals of reference indicate like parts in all the figures of the drawings.

Referring to the drawings, 1 1 represent the two oppositely-disposed longitudinal sides forming the table of my machine, said sides being supported above the sills 2 by the legs or uprights 3 and are rigidly spaced the desired distance apart by suitable transverse braces 4. On the inner faces of the sides 1 are provided conical flanges forming the inner and outer tracks 5 and 6, the inner track being nearly or partly surrounded by the outer track 6, as fully described in my former specifications.

Arranged upon the track 5 and inclosed by the track 6 are the rollers of an endless carrier-chain, which consists of a series of links or members arranged in pairs at each side of the machine, said links being connected and held in rigid parallel relation to each other by suitable transverse bars secured to their inner flanged bases. Each link comprises a cast-metal base 7, from which rise and are formed integral therewith the vertical parallel guide-arms $7^a$, which have their upper ends connected and formed on their outer face with a lug $7^b$. Each base 7 has formed on its under side and projecting outwardly and downwardly therefrom the single and double perforated bearing-lugs $7^c$ and $7^d$. Extending slightly outwardly and upwardly from the double bearing-lug $7^d$ in substantial parallel relation to the guide-arms $7^a$ is the lap-wing or single guide-arm $7^e$, which is made rigid with respect to its companion guide-arms $7^a$ by the brace $7^f$ and laps the side of the guide-arm of the next adjoining link, and has its upper segmental portion abutting against the lug $7^b$ thereon, as is described and claimed in my former patent, No. 718,077. I have slightly improved upon the construction contained in said former Letters Patent, however, by having the upper ends of the guide-arms $7^a$ curved inwardly and meeting in a point or apex $7^g$ instead of joining each other in a continuous curve, thereby forming a more positive lead for the guide-rollers of the cutting-frames and preventing them from being guided in the wrong direction as they strike the curved portions of the guide-arms in their descending movement. The single and double bearing-lugs of the adjoining links of the carrier are pivotally connected by a spindle 8, at the outer end of which is mounted an antifriction-roller $8^a$, which runs on the tracks 5 and 6 of the sides 1.

For the purposes of my present invention I connect the links of each pair or a portion of the pairs, as it may be desired to space the perforating means, by the lower and upper supporting-bars 9 and 10, respectively, which are provided at their ends with the alining apertures 11 for receiving bolts or other suitable means for securing them in superimposed position to the base portions 7 of the links. The upper bar 10 may be made shorter than the lower bar 9, as shown in Fig. 2, or be of equal length, as shown in Fig. 4. The bar 9 is formed at suitable points on its upper surface with one or more sockets $9^a$, in each of which is mounted a cylindrical box or casing 12 which has its lower portion open to said socket and its upper surface provided with a central aperture $12^a$, as shown in Fig. 11. A perforating-pin 13 is reciprocally mounted in vertical position within the box or casing 12 and has its upper end terminating within the aperture $12^a$ thereof and its lower end provided with a collar or head $13^a$, adapted to seat on the bottom of the socket $9^a$ in the bar 9. Depending from the collar $13^a$ and extending below the bar 9 through an aperture $9^b$, provided therein in axial relation to the socket $9^a$, is a plunger-rod $13^b$, which is adapted to coact at its lower end with suitable operating means, as hereinafter described. The pin 13 and connected parts are normally retained in the position shown in Fig. 11 by means of a coiled compression spring $13^c$, which is disposed between the collar $13^a$ and the upper end of the casing 12. The upper bar 10 is provided on its under surface with a number of sockets $10^a$, corresponding to the sockets in the bar 9 and in registering position therewith and of a size adapted to receive the portions of the boxes or casings 12, projecting above said latter bars. A perforation $10^b$, through which the upper end of the perforating-pin 13 is permitted to move, is provided through the bar 10 in axial relation to the socket $10^a$ therein, thus permitting the pin 13 to be reciprocated to perforate a column of clay carried by the upper bar.

Mounted transversely of the table of the machine in suitable bearings 14, provided in the sides 1 thereof and in vertical alinement with a point in the movement of the conveyer at which it is desired to perforate the moving clay column, is a shaft 15, which has keyed thereon intermediate of its bearings the two spur-gears 16 and pulleys or flat-faced wheels 17. The spur-gears 16 are positioned to mesh with suitable spurs or ribs $7^h$, provided on the under side of the base portion 7 of each link, thereby imparting movement in the proper direction to the conveyer, while the pulleys 17 are positioned to have their upper flat surfaces coact with the lower ends of the plunger-rods $13^b$ as they are carried along by the movement of the conveyer, thereby imparting a sufficient vertical movement to the perforating-pin 13 to perforate the clay column, as shown in Fig. 2. The wheels 17 are made of the same diameter as that of the pitch-line of the spur-gears 16, thus causing the face of the wheels 17 to be moved at the same speed as the endless carrier and overcoming nearly if not all of the slipping of the ends of the rods $13^b$ on the faces of the wheels as they pass thereover.

Movement is communicated to the shaft 15 through a spur-gear 19, which is mounted on one of the extended ends thereof and receives its power from any suitable source. The spur-gear 18 is mounted to turn loosely upon the shaft 15 and has its movement controlled with respect thereto by the two friction-disks 19, between which it is mounted, the inner disk being fixed to the shaft and the outer one adapted to have a movement on the feather $19^a$ toward and away from the outer face of the gear 18. To effect the proper frictional resistance between the frictional-disks 19 and gear-wheel 18, I thread a hand-wheel 20 on the outer end of the shaft 15 and interpose between it and the outer or movable disk 19 a washer 21, of any suitable compressible material, or a coiled compression-spring, if desired.

It will thus be seen that I have provided a very sensitive frictional device for controlling the movement of the shaft 15, which feature is most important to the successful operation of machines of this class, as the movement of the endless carrier or conveyer must necessarily be controlled by the clay column, as otherwise the plastic material which is forced from the die of the mill in a very thin stream or column would be torn or pulled asunder by a variation between the speed at which it is forced from the mill and the speed of the carrier. It is also necessary that the movement of the carrier accommodate itself to the varying speed of the clay column, which is due to the clay not being regularly fed to the mill or by its not being of an even temper, as is generally the case, for at times the clay in some portions of the pit is more moist than in others, or if tempered in a pug-mill the temperer gets it unevenly tempered by not regularly applying water to the clay, or if the water is regularly applied the unequal tempering may be occasioned by an irregular or uneven feeding of the clay to the mill. For these reasons the clay column is not regularly forced from the mill, for as the conditions of the clay vary so will the speed of the clay column.

While the gear-wheel 18 is normally driven at a speed greater than the speed of the endless carrier, it is possible by the use of a sensitive clutch mechanism, such as the one described, to so regulate the frictional resistance between the coacting surfaces of the gear 18 and disks 19 as to permit the movement of the clay column to control and regulate the movement of the carrier, imparting a slower or faster movement thereto as the conditions of the flow of the clay vary.

Rigidly bolted to the upper flanged portions of the sides 1 are the arches 22, which are provided at their upper ends with suitable bearings 22$^a$ for receiving the ends of the transverse shaft 23, on which the revolving cutter is centrally mounted. This cutter, which is described in detail in my former Letters Patent, No. 718,077, comprises the wheel 24 and the U-shaped cutter-arms 25, said cutter-arms being pivotally and movably attached to the rim of said wheel at regular distances apart and have their pivotal movements limited by means of the equidistant spurs or lugs 24$^a$, arranged about and radiating from the rim of the wheel. The outer ends of the cutter-arms are each provided with an antifriction-roller 25$^a$, which are adapted to engage the working faces of the links of the carrier and guide the course of the cutter-arms in the lower arc of their movement and are connected by a cutter-wire 25$^b$, as described in said patent. The length of cut of a shingle or tile depends upon the distance between the cutter-arms 25 to which the cutter-wire 25$^b$ are secured, which is shown in Fig. 1 as being every third cutter-arm.

An improved feature of the revolving cutter of my machine consists in the mounting of a trimming device in each of the cutter-arms carrying a cutter-wire, whereby the corners of a tile or shingle are caused to be trimmed in the desired shape immediately following the cutting operation which severs the preceding tile or shingle from the clay column. This trimmer comprises a cross-head 26, which has its ends perforated or provided with bearings 26$^a$ for receiving the rods or bars 27, upon which it is adapted to slide, the said rods or bars having their inner ends made fast within the apertures 27$^a$, provided in the horizontal portion of the cutter-arm and their outer ends extending toward and terminating near the cutter-wire of the associated cutter-arm, as shown in Fig. 3. The end portions of each cross-head are formed in any desired shape adapted to receive the trimmer-knives 28, which extend therefrom toward the cutter-wire and are set at an angle at which it is desired to trim or cut off the lower corners of a roofing-tile. The trimmer-knives may be made of a shape in which it is desired to trim the corners or lower edge of a roofing-tile or may be left off entirely should it be desired to manufacture roofing-tile having their lower edges squared.

An operating-arm 29 is mounted to reciprocate within an aperture or bearing 30, provided in radial position through the horizontal portion of each cutter-arm 25, and has its outer end fixed to the cross-head 26 of the associated cutter-arm and its inner end provided with a laterally-projecting stud or spindle, on which is mounted a roller 29$^a$ for traveling within the laterally-disposed groove or guide-way 31$^a$, provided peripherally of the cam-disk 31, from which the cross-heads of the different cutter-arms are caused to receive a reciprocatory movement as the cutter revolves on its shaft 23. The cam-disk 31, which is loosely mounted on the shaft 23 at one side of the wheel 24, is made ovoid in shape and has its longest radiating portion extended toward the endless carrier, so that the cross-heads 26 are caused to have their limit of outward movement when they are in lower perpendicular position. The cam-disk 31 is braced against lateral movement and also against turning on the shaft 23 by means of a bracing member 32, which has one end securely fastened to the upper portion of the contiguous supporting-arch 22 and its other end bolted to the outer face of the cam-disk, as shown in Fig. 3.

Mounted in substantial vertical alinement with the shaft 23 in suitable bearings or hangers secured to the sides of the carrier-table is a shaft 34, which has fastened thereon the rotary wire-cleaning reel or drum, forming an important part of my present invention. This reel or drum comprises the two spaced hub portions 35, from each of which radiate a plurality of spokes or arms 36. The outer ends of the transversely-alining arms of each hub portion are connected by a flexible wiper-strip 37 of any suitable material—for instance, such as felt—said strips having their inner edges securely fastened between two clamping-strips 37$^a$ and their outer edges projecting beyond the ends of the arms 36 and forming flexible strips on the periphery of the reel or drum. The reel or drum is so positioned with respect to the cutter device that the flexible strips 37 thereof are adapted to have yielding contact with the cutter-wires of the revolving cutter as each is passed between and below the inner surface of the supporting-bars of the carrier after passing through and severing the clay column, as shown in Fig. 3. Keyed to one of the ends of the shaft 34 is a small pulley 38, which connects with a larger pulley 39 on the shaft 15, from which it receives its power through the medium of the belt 40, thereby causing the wiper wheel or reel to revolve at a greater speed than the revolving cutter, which has its movement controlled by the movement of the endless carrier and in the same direction as the carrier. As the wiper-reel is moved more rapidly than the revolving cutter, two or more of the wiper-strips 37 are caused to have contact with a cutter-wire before it has moved out of the path thereof after making a cut, thereby removing all cuttings or accumulated portions of the plastic material which were carried therewith down between the bars of the carrier. As a wire is being acted upon by the wiper-reel the cutter-arm to which it is secured is firmly held against a movement independent of the movement of the cutter by the links of the carrier between which its guiding-rollers pass. A rotary cleaner is preferable to an oscillatory cleaner, inasmuch as the oscillations of the latter would have a tendency to alternately quicken and retard the movement of the carrier, thereby creating a jar on the machine. The use of the flexible wiper-strips 37 are also preferable to the use of brushes, as the latter would soon become filled up with sticky or plastic cuttings brought down by the cutters and thus be made inoperative.

The delivery-table 41, which is mounted at the rear of the endless carrier with its upper surface on a plane with the upper surface of the carrier-bars when in upper horizontal position, is similar in construction to that described in my Patent No. 718,077 and is adapted to support the clay column 42 as it emerges from the die 43 of the mill and until it has transversed the space intervening between it and the endless carrier of the machine.

The tracks 5 and 6 of the sides 1 embody certain improved features of construction over my former patents, in which the decline at the forward end of the tracks descends on a gradual curve until it meets the abrupt curve at the front end thereof. The present improvement consists in changing rather abruptly from the upper horizontal line of the tracks to a forward declined plane of about seventeen or eighteen degrees and continuing in that plane until it intersects the line of the small downwardly and rearwardly extending curve at the extreme forward end, thereby providing a flat descending surface near the forward end of the track which allows a series of the sections or links to firmly abut on that portion of the track, the same as on the horizontal portion thereof. This construction enables a series of the severed sections of the column to abut, the combined frictional resistance of which on the carrier aids in carrying the sections forward and forcing them over a delivery-table at the forward end of the machine, thereby preventing the sections from working back and obstructing the ascending wires of the cutter.

The operation of my improved machine is as follows: The clutch mechanism on the shaft 15 is first adjusted by a turning of the hand-wheel 20 to impart rotation to said shaft from the driven spur-gear 18, which movement is communicated to the endless carrier of the machine through the medium of the gear-wheels 16, the spurs of which mesh with the ribs or racks formed on the under sides of the base portions 7 of the links of the carrier and is also communicated to the wiper wheel or reel through the medium of the pulleys 39 and 38 and connecting-belt 40. As the column of clay issues from the die of the mill it is forced over the delivery-table 41 and comes in contact with the endless carrier of the cutting-machine, thus tending to force the carrier over its track. It is now necessary to adjust to a nicety the frictional resistance between the friction-disks 19 and gear-wheel 18, so that the movement of the carrier is controlled by the movement of the clay column, running faster or slower as the conditions of the feed of the clay may vary, instead of being positive at all times, thus preventing the clay column from being pulled asunder due to the carrier running at a greater speed than the feed of the clay column from the die. As the column-supporting bars in which the perforating devices are located are carried along the lower ends of the suspended plunger-rods $13^b$ come in contact with the peripheries of the flat-faced wheels 17 on the shaft 15 and cause the connected pins 13 to be raised to perforate the clay column to form nailholds in the roofing tile or shingles, which are afterward severed from the column by the cutter-wheel. The movement of the carrier causes the cutter-wheel to revolve by reason of the fact that the rollers $25^a$ of the cutter-arms 25 are engaged by the forward face of the main portion $7^a$ of the guide-arms and the lap-wing $7^e$ of the preceding guide-arm of the carrier in the same manner that a rack-bar engages the teeth of a spur-gear. As the column of clay advances the cutter-wires of the cutter-arms equipped therewith are carried down through the same, so that the column is cut in sections of proper length to form the roofing tile or shingles. As soon as the cutter-wires have passed down between the carrier-bars they are acted upon by the flexible wiper-strips 37 of the revolving wiper-reel and caused to be cleaned of all cuttings adhering thereto. As each cutter-arm passes the perpendicular and moves upward the preceding link of the carrier reaches the curved portion of the track, and as its upper portion and that of its lap-wing $7^e$ diverge from the next succeeding link the cutter-arms are drawn away from the forwardly-moving end of the column by reason of the rollers $25^a$ of the cutter-arms being in contact with the forward face of the lap-wing 7ᵉ as it diverges from the next succeeding guide member, thus rendering impossible any contact whatever between a cutter-wire and the column after the wire has made a cut and is being elevated. As the operative cutter-arm descends to sever a previously-perforated section from the column the trimmer-head 26, carried thereby, is caused to have an outward radial movement by reason of the roller 29ᵃ on the operating-arm 29 traveling in the groove 31ᵃ to the lower extended portion of the ovoid cam-disk 31. The movement of the trimmer-head is sufficient to cause the trimmer-knives 28, carried thereby, to pass through the clay column and coact with the registering carrier-bars when the associated cutter-arm has reached a perpendicular plane, thus trimming the end of the column in the desired shape, after which the trimmer-head is gradually drawn back into normal position as the cutter-arm ascends.

It is obvious that such changes in the form, proportion, and minor details of construction of the parts as fairly fall within the scope of my invention may be made without departing from the spirit or sacrificing any of the advantages thereof.

Having thus described my invention, what I claim as new, and desire to secure by Letters Patent, is—

1. In a machine of the class described, the combination with the endless carrier, of a perforating device in a desired number of the links thereof, and means for causing a movement of each perforating device at a fixed point in the line of travel of the carrier to perforate an object carried thereby.

2. The combination with an endless carrier comprising a plurality of pivotally-connected links having horizontal carrying portions, of perforating means mounted in all or a portion of the horizontal carrying portions of said links, and means for separately actuating a movement of the perforating means of each link at a fixed point in its line of travel.

3. The combination with a frame having a track, and an endless carrier arranged for movement thereon, of one or more perforating-pins carried by certain of the links of said carrier, and means mounted within the track adapted to cause a reciprocatory movement of the pins in each link at a fixed point in their line of travel, whereby an object supported by said carrier is perforated.

4. The combination with a frame and an endless carrier arranged for movement therein, of spaced perforating-pins mounted in said carrier, means for normally retaining said pins in inoperative position, and means for causing a movement of said pins at a fixed point in their line of travel whereby an object carried by said carrier is equidistantly perforated.

5. The combination with a frame, and an endless carrier arranged for movement thereon, of a series of perforating-pins mounted on said carrier in equidistant position and having portions projecting below the carrier-bars, and rotatable wheels mounted in said frame and positioned to have their upper surfaces coact with the projecting portions of said pins as they are moved thereover whereby the outer ends of the pins are forced beyond the faces of the carrier-bars.

6. In a machine of the class described, a frame, an endless carrier arranged to move therein and consisting of a series of loosely-connected sections, each section comprising end portions and a cross-bar connecting said portions, said bars having one or more sockets formed therein, a head reciprocally mounted in each socket and having pins projecting in opposite directions therefrom and through the ends of the socket exteriorly of the bar, means coacting with said head for normally retaining the end of the upper pin below the surface of the bar, and means mounted in said frame for causing an outward movement of the pins at a fixed point in the line of travel of the bars, for the purpose described.

7. In a machine of the class described, the combination with the endless carrier consisting of a series of loosely-connected supporting-bars, of one or more supporting-bars having apertures provided therethrough, perforating-pins mounted to reciprocate in said apertures and normally retained with their outer ends drawn therein and their lower ends extended, and means for coacting with said pins at a fixed point in their line of travel adapted to cause an outward movement of said pins to perforate an object carried by said carrier.

8. In a machine of the class described, the combination with a frame, and an endless carrier arranged for movement therein, of a series of cutter-arms revolubly mounted above said carrier, trimmer means carried by each operative cutter-arm, and means for causing a reciprocatory movement of said trimmer means with respect to its cutter-arm as said arms are revolved.

9. In a machine of the class described, the combination with the frame, the carrier, and the superimposed cutter-wheel having a plurality of cutter-arms radiating therefrom, of a trimmer-head reciprocally mounted in each operative cutter-arm, and means for imparting a reciprocatory movement to the trimmer-head of each arm as said arms revolve.

10. In a machine of the class described, the combination with the revolving cutter-wheel, and cutter-arms radiating therefrom, of a trimmer-head reciprocally carried by each cutter-arm, means for causing a reciprocal movement of the trimmer-heads as the arms are revolved adapted to cause each trimmer-head to reach its limit of outward movement at a fixed point in the line of movement of the connected cutter-arm.

11. In a machine of the class described, the combination, with the revolving cutter-arms, of trimmer-heads carried thereby for trimming the ends of sections cut by the cutter-arms.

12. In a machine of the class described, the combination with the revolving U-shape cutter-arms having cutter-wires disposed at their outer ends, of a trimmer device reciprocally carried by each cutter-arm, and means for imparting the proper reciprocatory movement to said trimmers to trim the sections cut by the cutter-wires of the cutter-arms.

13. In a machine of the class described, the combination with the revolving cutter-arms, of trimmer-heads reciprocally mounted in said arms, a disk fixed at the side of said cutter-arms and having a cam-groove in the side thereof, an arm projecting rearwardly from each trimmer-head and having a portion disposed to travel in the cam-groove, whereby as the arms are revolved a reciprocatory movement is imparted to the trimmer-heads.

14. In a machine of the class described, the combination with a cutter-arm of the revolving cutter, of a trimmer-head carried thereby and having knives removably attached thereto for trimming the sections cut by the cutter-arm, and means for imparting the proper movement to said trimmer-head.

15. In a machine of the class described, the combination with the cutter-wheel, of a revolving wiper-wheel having flexible felt wiper-strips arranged about its periphery longitudinally thereof, said wiper-wheel being disposed so that its wiper-strips have contact with the cutting means of the cutter-wheel after a cut has been made.

16. In a machine of the class described, the combination with an endless carrier having spaced pivotally-connected links, and a cutter-wheel rotatably mounted above said carrier and adapted to have its cutting-arms pass between the carrier-links, of a wiper-wheel rotatably mounted below the upper portion of the carrier and having a plurality of radiating disposed flexible wiper-strips adapted to have contact with the cutter-arms after a cut and to revolve in the direction of movement of the carrier.

17. In a machine of the class described, the combination of a frame having an endless track formed therein, said track comprising two parallel horizontally-disposed portions each merging at their rear in a connecting-arc and the upper track having its forward end changing to a straight decline of substantially seventeen or eighteen degrees which continues for a short distance in the same plane and then changes abruptly to a rearward curve and joins the forward end of the lower track, and an endless carrier arranged for movement on said track.

18. In a machine of the class described, the combination with a frame, an endless carrier arranged for movement in said frame and having the under side of its links provided with spurs to form a rack, of a shaft mounted transversely in said frame, a spur-gear fixed to said shaft in position to mesh with the rack formed on the carrier, a drive-gear loosely mounted on the end of said shaft, a fixed and a longitudinally-movable friction-disk mounted on opposite sides of said drive-gear, and means for moving the movable disk to cause the drive-gear to be frictionally engaged between the two disks at the desired tension.

In testimony whereof I have hereunto signed my name to this specification in the presence of two subscribing witnesses.

JACOB BENSING.

Witnesses:
CORNELL SCHREIBER,
C. W. OWEN.